C. R. SANDERS.
WOOD HEEL GROOVING MACHINE.
APPLICATION FILED APR. 11, 1914.

1,213,271.

Patented Jan. 23, 1917.
2 SHEETS—SHEET 1.

Witnesses:
H. B. Davis
A. E. Sullivan

Inventor:
Clyde R. Sanders
by Noyes & Hamman
Attys

C. R. SANDERS.
WOOD HEEL GROOVING MACHINE.
APPLICATION FILED APR. 11, 1914.

1,213,271.

Patented Jan. 23, 1917.
2 SHEETS—SHEET 2.

Witnesses:
H. B. Davis.
A. E. Sullivan.

Inventor:
Clyde R. Sanders
by Noyes & Harriman
Att'ys

UNITED STATES PATENT OFFICE.

CLYDE R. SANDERS, OF GEORGETOWN, MASSACHUSETTS.

WOOD-HEEL-GROOVING MACHINE.

1,213,271.  Specification of Letters Patent.  Patented Jan. 23, 1917.

Application filed April 11, 1914. Serial No. 831,308.

*To all whom it may concern:*

Be it known that I, CLYDE R. SANDERS, a citizen of the United States, residing at Georgetown, in the county of Essex and State of Massachusetts, have invented an Improvement in Wood-Heel-Grooving Machines, of which the following is a specification.

In the manufacture of wood heels it is customary to perform various successive operations upon a wooden block, which has previously been sawed into such shape that subsequent operations may be performed with as little difficulty as possible. One of these operations consists in shaping that portion of the heel known as the breast. This operation is usually performed with a rotary cutter shaped longitudinally to correspond to the required shape of heel breast, the operation being usually called "grooving", as the transverse cut which is taken is concave.

The object of my invention is to provide a machine for automatically grooving the breasts of wood-heel-blanks, which will enable this work to be performed by practically unskilled labor, with no more effort than is required merely to place the blank in the machine, which will securely clamp the blank and hold it in place automatically during the grooving operation and will automatically discharge it at the end of said operation, and which will enable the operation to be rapidly performed. I accomplish these objects by the means shown in the accompanying drawings, in which—

Figure 1:
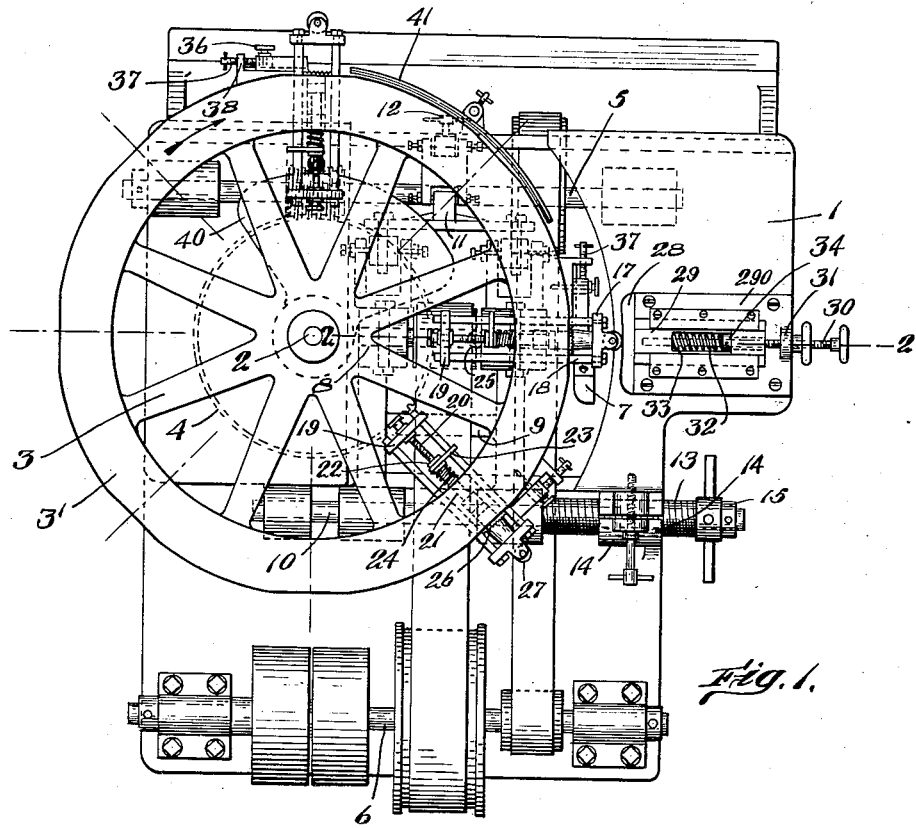
Figure 2:
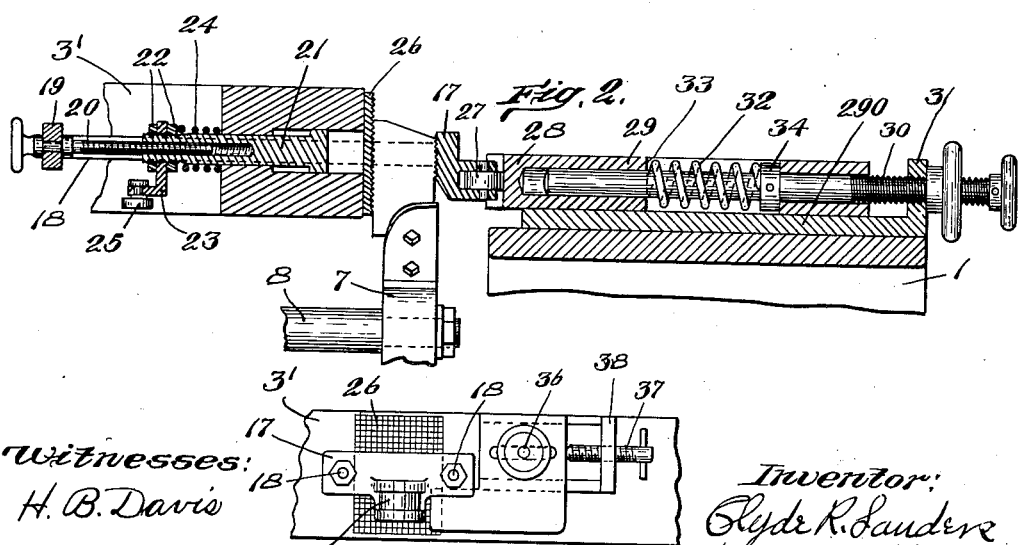
Figure 3:
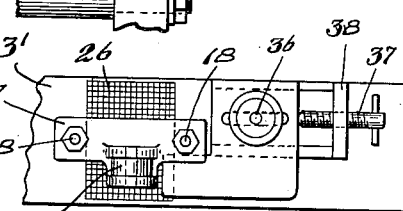
Figure 4:
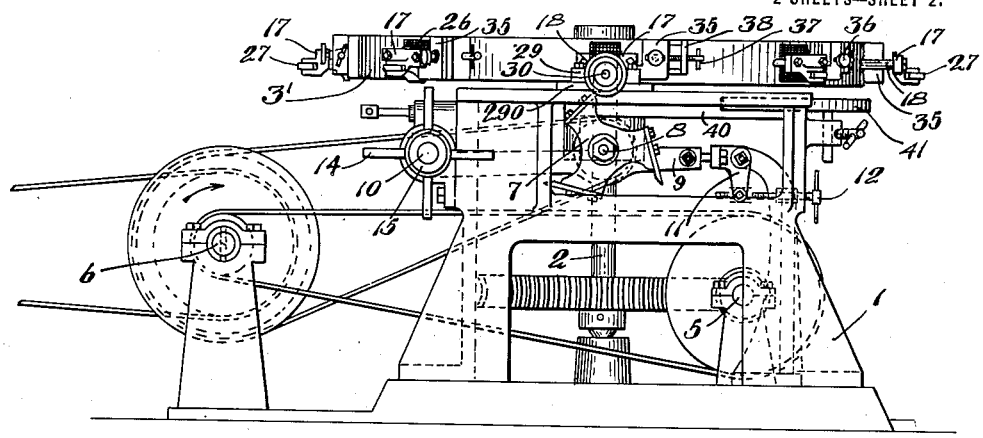
Figures 5, 6:
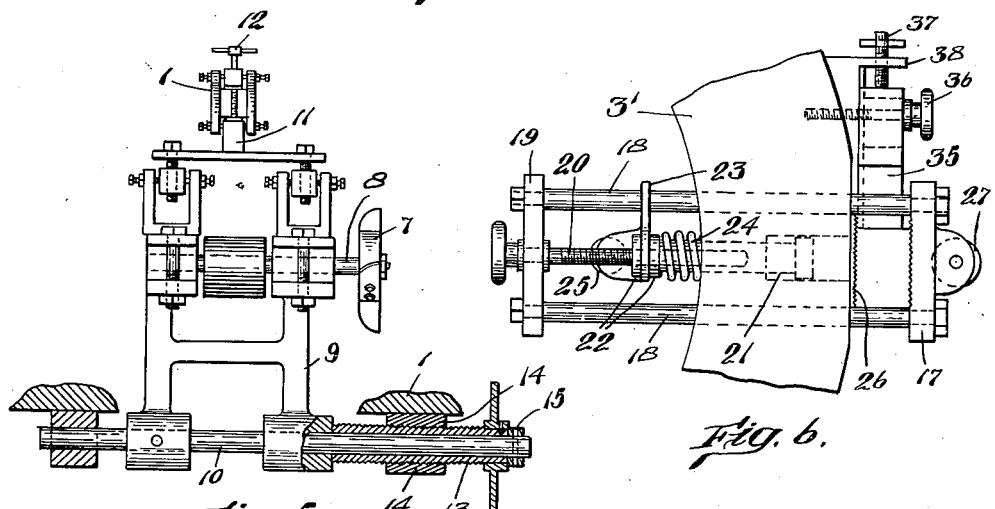
Figure 7:
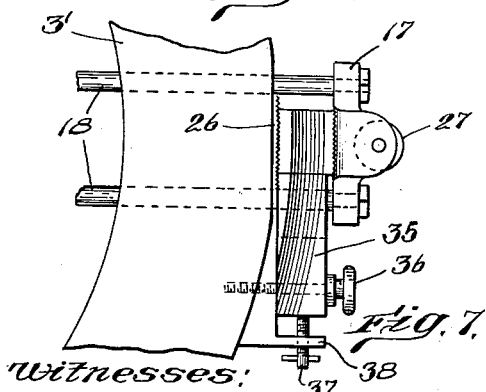
Figures 8, 9:
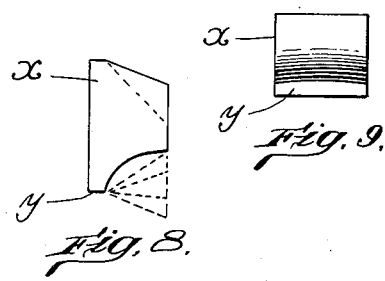

Figure 1, is a plan view of a machine embodying my invention. Fig. 2, is a sectional view, on an enlarged scale, taken at line 2, 2, of Fig. 1. Fig. 3, is a detail view of a portion of the blank-holding means. Fig. 4, is a side elevation of the machine. Fig. 5, is a plan view of the rotary cutter adjusting frame. Fig. 6, is a detail plan view of one of the clamps. Fig. 7, is a bottom plan view thereof. Figs. 8 and 9, are side and front views respectively of a heel blank.

In the drawings, the frame 1, of the machine has a shaft 2, mounted vertically therein, and a carrier 3, is mounted on the upper end of said shaft, so that it may rotate in a horizontal plane. The shaft 2, is provided with a worm gear 4, which is driven from a corresponding gear on the shaft 5, the latter being driven from a counter-shaft 6.

A rotary cutter 7 is mounted on a shaft 8, journaled in a frame 9, said frame being secured to and supported at one end on a shaft 10, rotatably supported in the frame, and providing a pivot therefor. The opposite end of the frame from the shaft 10, is supported by a bell-crank lever 11, which is mounted on the frame 1, one end of said lever 11 being connected to the frame 9 by a pair of flexible joints arranged to permit relative lateral, as well as vertical, swinging movement. The other end of said lever 11 is engaged by an adjusting screw 12, so mounted in the frame, that, by turning said screw in opposite directions, the frame 9 may be swung upwardly or downwardly about the shaft 10 as a pivot, thus raising or lowering the cutter shaft 8. Means permitting adjustment axially of the cutter shaft 8, as well as transversely thereof, are also provided, comprising an adjusting screw 13 which is threaded in a lug 14, on the frame 1, and having a central bore, through which the shaft 10 extends. One end of the screw 13 is arranged to engage one side of the frame 9, and the other end to engage the collar 15, on said shaft 10, so that by turning the screw 13 in opposite directions the shaft 10 may be caused to move longitudinally in corresponding directions, and, as the frame 9 is secured to the said shaft 10, the frame will also be caused to move axially of the cutter shaft.

The carrier 3 is preferably of wheel-like construction, having an annular rim portion 3', although other forms of carriers may be provided. Said rim-portion 3' is provided with a series of clamping devices, all of which are of identical construction, and are arranged upon the rim at equal distances apart. While only three of said clamps are shown in Fig. 1 of the drawings, it will be understood that one of the said clamps is provided at each flattened portion, indicated on the periphery of the rim. Inasmuch as said clamping devices are all identical in construction, a description of one will suffice.

A yoke 17 is mounted on the outer ends of a pair of rods 18, which are reciprocally mounted in the rim 3' in parallelism and also in parallelism with a radial line of the carrier midway therebetween. A cross-bar 19 is also mounted on the inner end of said rods 18 and an adjusting screw 20 is swiveled in said cross-bar and extends in a radial direction toward the rim. A guide pin 21 is slidably mounted in the rim 3' in central alinement with the screw 20. A pair of stop nuts 22 are externally threaded upon the guide pin 21 and a bracket 23 is clamped thereon between said nuts as best shown in Fig. 2. A spring 24 is arranged on the guide pin 21 between the nuts 22 and the inner surface of the rim 3', and a friction roll 25 is mounted on the bracket 23 for the purpose hereinafter described. The inner surface of the cross-bar 17 is preferably corrugated and a corrugated plate 26 is provided on the rim 3' opposite said cross-bar, whereby clamping surfaces are provided, adapted to engage opposite sides of a heel blank. With this construction, the spring 24, acting against the inner side of the rim 3', tends to force the yoke, formed by the rods 18 and cross-bar 17, inwardly, to draw the clamping faces of the clamp together, and, by adjusting the screw 20, the position of the yoke and cross-bar 17, with relation to the plate 26, may be varied without disturbing the spring 24, which will act to resist the opening of the clamp members to the same extent, whatever the position of adjustment of said members may be. The purpose of this adjustment is to enable the normal distance between the clamp members to be varied and blanks of different sizes to be clamped with the same force under all conditions.

A friction roll 27 is mounted on the outer side of each cross-bar 17 in position to engage a pressure head 28, which is mounted on a slide 29, arranged in dovetailed guides formed in a plate 290, removably secured to the frame, whereby said head 28 is permitted to move laterally in a radial direction with relation to the carrier 3. An adjusting screw 30 is threaded in a lug 31 on the plate 290 and extends through the slide longitudinally thereof. A recess is provided in said slide to receive a spring 32 which is mounted on the adjusting screw 30 and is arranged between a shoulder 33 at the inner end of said recess and a collar 34 secured on the screw 30. With this construction, by adjusting the screw 30, so that its collar 34 is moved toward the carrier, said collar, through the spring 32, will push the slide 29 and head 28, in the same direction, and when the collar is moved in the opposite direction, it will draw the slide and head away from the carrier. The initial position of the head 28 may thus be varied without varying the tension of the spring 32, i. e., the latter will resist the movement of the head away from the carrier with the same force in all positions. The purpose of this adjustment is to vary the position of the head 28 according to the different positions to which the bar 17 may be adjusted.

An adjustable abutment 35 is mounted on the rim of the carrier at the side of each clamp and is adapted to be secured therewith by the clamp screw 36 and to be engaged by a stop screw 37 mounted on a lug 38 secured to said rim.

A stationary cam 40 is mounted on the frame in a horizontal position directly beneath the carrier and closely adjacent thereto, said cam having both ends provided with inclined or rounded faces, disposed at opposite angles, and an intermediate convex face curved concentrically with the axis of the vertical shaft 2. Said surfaces of said cam 40 are arranged in position to be engaged by the friction roll 25 on the clamps, as will be hereinafter explained.
A gage, or guard 41, is mounted on the frame closely adjacent the peripheral surface of the rim 3' and extends horizontally from a point opposite the middle portion of the cam 40 to a point opposite and slightly beyond one end thereof, as indicated in Fig. 1.

The heel blanks to be operated on in the machine, are of various forms, but are provided with opposite parallel faces representing the base and top surfaces of the heel. Each blank is also provided with a face $y$, at the breast, which is in the same position on all blanks, the other portions of the breast being varied according to the particular form of breast to be formed, as indicated by the different dotted lines in Fig. 8.

The operation of the machine is as follows: The counter-shaft 6 being driven, the cutter-shaft 8 and the carrier-shaft 2, are driven at constant speeds, relatively proportioned to requirements. The carrier is driven clockwise, or in the direction of the arrow in Fig. 1, and, as it rotates, the friction roll 25 of a clamp will be brought into engagement with one inclined end of the stationary cam 40, and said roll will ride thereon causing the yoke 17 of the clamp to be pushed outwardly and compressing the spring 24. The cross-bar 17 is thus moved away from the plate 26 far enough to permit the operator to place one of the heel blanks therebetween, the initial relative positions thereof having been previously adjusted by the screw 20, as before explained. The operator places the blank between the jaws of the clamp, breast downward, so that the breast face $y$ rests upon the guard 41, which is so located as to support the blank in the desired position in the clamp, and, as the carrier rotates, the blank is slid along on said guard and, at the same time, the roller 25 runs along on the stationary cam 40, holding the clamp open, until it passes down the other inclined end of the cam 40, and then the spring 24 is free to act to draw the cross-bar 17 toward the carrier, so that the blank is clamped between the clamp members. The friction of the blank on the guard 41 causes the blank to be held against the abutment 35 until it is clamped, said abutment being so arranged that the central point of the face $y$, will be held in alinement in the radial line which is perpendicular to the clamping faces of the carrier, as indicated in Fig. 7. As soon as the blank is clamped securely, it moves out of contact with the supporting guard 41. As the motion of the carrier is continued the friction roll 27 engages the abutment 28, and rides up the inclined end thereof, so that the head 28 is forced outwardly against the action of the spring 32, and the outer member of the clamp is forced inwardly with a corresponding force, and, as said spring 32 is much stiffer and stronger than the spring 24, the blank will be clamped between the clamping members with much greater force, while the roller 27 is in engagement with the surface of the head 28, than it is at other times. While the blank is thus firmly held by the spring 32, acting on the member 17 of the clamp, it is carried into engagement with the cutter 7, which latter is so shaped and arranged that it forms a groove of the desired shape across the then under side of the blank. The provision of supplemental means for holding the blank while it is being operated on by the cutter makes it unnecessary to provide each clamp with anything more than a comparatively light spring sufficient to hold the block firmly in place, until it is clamped by the action of the heavy spring 32. As the blank is carried in a curved path while it is being operated on by the cutter, the groove which is formed thereon will be correspondingly curved. The formation of the groove on this curve is advantageous for the reason that, as the outer surface of the shoe, to which the heel will be subsequently attached, is curved convexly, and the base or seat of the heel, in a subsequent process, is concaved, the whole of the end face $y$ being, at the same time, removed to permit the grooved breast to extend to the shank, the transverse curve of the groove will correspond, to an extent, to the curve of the shank, and also to the curve of the concave in the heel-seat, so that, in some instances, the work of scouring the shank of the heel will, to an extent, be lessened. Furthermore, as the center of the heel is held in a radial line of the carrier, when it is grooved, the curve will be uniform, or will not be carried toward the heel seat to any greater extent at one side than at the other. Immediately after the blank is carried out of engagement with the cutter, the roller 27 will also be carried out of engagement with the pressure plate 28, but the blank will still be held in position in the clamp by the spring 24, but when the clamp containing the blank is carried around until the friction roll 25 again engages the inclined end of the cam 40, the clamp will again be opened and the blank will be permitted to fall from the clamp into a suitable receptacle, and immediately thereafter the operator inserts a fresh blank so that the operation will be repeated.

The abutment block 35, in addition to performing the function of a centering stop for holding the blank in the desired position in the clamp, also acts to hold the blank from being moved sidewise in the clamp by the action of the cutter, which is rotated against the direction in which the blank is moved, and furthermore, prevents the splintering of the blank by the cutter as it emerges from the opposite side of the blank from that at which it entered, the abutment acting to hold the wood fibers up to the cutter, so that they will be severed. In practice, this abutment 35 is made of wood and is renewed when a new shape of cutter is employed so that, on the first operation, the cutter shapes the abutment to correspond to the groove which is cut in the blank, as indicated in Fig. 7.

The vertical and longitudinal adjustment of the cutter is important, as it enables the depth of the groove with relation to the back of the heel, and also with relation to its base, to be varied.

It will be apparent from the foregoing, that after the parts are properly adjusted, the operations upon the blank may be rapidly performed, the operator merely having to place the blank in each clamp, after it is opened, the clamping, grooving, and subsequent discharging, all being automatically performed.

I claim:

A machine of the character described, comprising a rotary carrier having a clamp thereon, a rotary cutter arranged to engage a blank held by said clamp, as the carrier carries the same thereover, an abutment arranged to engage the opposite side of the blank from that first engaged by the cutter, while held in the clamp, and means permitting adjustment of said abutment longitudinally of the path of the clamp to hold the blank in central radial relation with the axis of the carrier.

In testimony whereof, I have signed my name to this specification, in the presence of two subscribing witnesses.

CLYDE R. SANDERS.

Witnesses:
L. H. HARRIMAN,
H. B. DAVIS.